US012637299B2

(12) United States Patent (10) Patent No.: US 12,637,299 B2
Bednar et al. (45) Date of Patent: May 26, 2026

(54) METHOD AND SYSTEM FOR SWITCHING A WORKPIECE

(71) Applicant: BAVIUS TECHNOLOGIE GMBH, Baienfurt (DE)

(72) Inventors: Robert Bednar, Ravensburg (DE); Alexander Fitz, Bad Waldsee (DE); Werner Zell, Mühlhausen (DE); Armin Walther, Kaufbeuren (DE)

(73) Assignee: BAVIUS TECHNOLOGIE GMBH, Baienfurt (DE)

( * ) Notice: Subject to any disclaimer, the term of this patent is extended or adjusted under 35 U.S.C. 154(b) by 0 days.

(21) Appl. No.: 18/873,545

(22) PCT Filed: May 11, 2023

(86) PCT No.: PCT/EP2023/062585
§ 371 (c)(1),
(2) Date: Dec. 10, 2024

(87) PCT Pub. No.: WO2023/237285
PCT Pub. Date: Dec. 14, 2023

(65) Prior Publication Data
US 2025/0320069 A1     Oct. 16, 2025

(30) Foreign Application Priority Data
Jun. 10, 2022     (DE) ...................... 10 2022 114 681.2

(51) Int. Cl.
*B65G 47/248*                (2006.01)
(52) U.S. Cl.
CPC .................................. *B65G 47/248* (2013.01)
(58) Field of Classification Search
CPC ............ B23Q 7/1431; B23Q 2240/002; B23Q 2703/02; B23Q 2703/04; B23Q 3/06;
(Continued)

(56) References Cited

U.S. PATENT DOCUMENTS 6,659,265 B2 * 12/2003 Pfeilschifter .......... B65G 57/08
                                                                 414/737
7,437,810 B2 * 10/2008 Ota ......................... B23Q 1/66
                                                                 29/33 P
(Continued)

FOREIGN PATENT DOCUMENTS

DE        102019213872 A1 *  3/2021  ............... B65G 1/06
EP            3626389 A1      3/2020
(Continued)

OTHER PUBLICATIONS

ISA European Patent Office, International Search Report Issued in Application No. PCT/EP2023/062585, Jul. 28, 2023, WIPO, 4 pages.

*Primary Examiner* — Gregory W Adams
(74) *Attorney, Agent, or Firm* — McCoy Russell LLP

(57)                ABSTRACT

In a method for switching a workpiece, which is fixed on a pallet, after one workpiece side has been machined in a horizontal machine tool, the pallet is brought into a transfer position in which the machined side of the workpiece faces in a direction toward a pallet support, an additional pallet is provided there, and the workpiece is transferred, with the machined side first, onto a clamping apparatus of the additional pallet and is guided back into the tool with the additional pallet. In a system for switching, the pallet support has a positioning device by means of which the semi-machined workpiece can be transferred, with the machined side first, to a clamping apparatus of the additional pallet.

20 Claims, 13 Drawing Sheets

(58) Field of Classification Search
    CPC .......... B23Q 3/088; B23Q 7/046; B23Q 7/04;
                    B23Q 7/1463; B21D 43/145; B65G
                    47/248; B65G 47/90; B65G 49/061;
                    B65G 47/847; B65G 17/323
    USPC ........... 414/222.07, 222.01, 286; 198/346.1;
                    29/33 P
    See application file for complete search history.

(56)                    References Cited

U.S. PATENT DOCUMENTS

| | | | | |
|---|---|---|---|---|
| 10,179,382 | B2 * | 1/2019 | Miyazaki | ............. B23Q 7/1426 |
| 10,870,545 | B2 * | 12/2020 | Lang | .................... B65G 49/061 |
| 12,070,828 | B2 * | 8/2024 | Zell | ........................ B23Q 7/005 |
| 12,151,328 | B2 * | 11/2024 | Bader | .................. B23Q 7/1463 |
| 2006/0130311 | A1 * | 6/2006 | Kikuchi | ................... B23Q 7/02 |
| | | | | 29/563 |
| 2012/0207575 | A1 * | 8/2012 | Masoero | .............. B65G 49/068 |
| | | | | 414/751.1 |
| 2017/0297157 | A1 * | 10/2017 | Podiebrad | ............ B23Q 7/1431 |
| 2020/0086439 | A1 * | 3/2020 | Muratori | ................ B23Q 7/046 |
| 2022/0324072 | A1 * | 10/2022 | Zell | .......................... B23Q 1/66 |
| 2022/0331918 | A1 * | 10/2022 | Bader | .................. B23Q 1/0027 |

FOREIGN PATENT DOCUMENTS

| | | | | |
|---|---|---|---|---|
| JP | 2012046315 | A | 3/2012 | |
| WO | 2021047836 | A1 | 3/2021 | |
| WO | 2021047837 | A1 | 3/2021 | |
| WO | WO-2021047838 | A1 * | 3/2021 | ........... B23Q 7/1421 |

* cited by examiner

METHOD AND SYSTEM FOR SWITCHING A WORKPIECE

CROSS REFERENCE TO RELATED APPLICATIONS

The present application is a U.S. National Phase of International Application No. PCT/EP2023/062585 entitled "METHOD AND SYSTEM FOR SWITCHING A WORKPIECE," and filed on May 11, 2023. International Application No. PCT/EP2023/062585 claims priority to German Patent Application No. 10 2022 114 681.2 filed on Jun. 10, 2022. The entire contents of each of the above-listed applications are hereby incorporated by reference for all purposes.

TECHNICAL FIELD

The invention relates to a method according to the preamble of claim 1 and to a system according to the preamble of claim 12.

BACKGROUND AND SUMMARY

In a method known from WO 2021/047838 A, the semi-machined workpiece is removed from the horizontal machining center with the machined side facing upwards, together with the pallet that will support the workpiece during machining, by means of a transport device from a support provided on the bottom, e.g. to a set-up station where the workpiece is manually transferred from the front to the rear side on a pallet with the help of personnel and auxiliary equipment, such as lifting gear, which is then returned to the horizontal machining center for finishing, for example. This is time-consuming and laborious.

If this involves workpieces made of light metal or light metal alloys, and used as aircraft parts, for example, these can have dimensions of B: L of approx. 4 to 6 meters and a weight of several tons as blanks. After the first machining step, the workpieces may still weigh more than a ton and be correspondingly difficult to manipulate. The finished workpiece then still weighs several hundred kilograms. Blanks can be unmachined here, or they can already show partial machining.

Machining is carried out in a horizontal machining center (stand-alone operation), for example in two steps, each on a pallet, wherein the second step is carried out after switching and re-clamping the workpiece, or in a cell consisting of several horizontal machining centers, in which the re-clamped workpiece is finish-machined in the second step in a different horizontal machining center.

In the horizontal machining center, two pallets can be temporarily held, e.g. with workpieces back to back on the pivot arms and pallet supports, in order to bring a workpiece to be machined more quickly into the machining position in the horizontal machining center, while the one that has just been machined is removed with its pallet and removed. Alternatively, only one pallet with or without a workpiece can be manipulated in the horizontal machining center.

Further prior art can be found in WO 2021/047837 A1 and WO 2021/047836 A1.

The problem underlying the invention is to provide a method and system of the type mentioned introductorily, which at least simplifies the necessary switching or re-clamping of the semi-machined workpiece.

The problem is solved with the method according to claim 1 and the system according to claim 13.

In the method, the pallet with the semi-machined workpiece is first moved when being relocated in the direction towards the pallet support at the horizontal machining center to a turned transfer position, in particular pivoted and turned, so that the machined side of the semi-machined workpiece faces outwards from the machine, to a further empty pallet that has a workpiece clamping apparatus for the workpiece. In the transfer position of the pallet, the semi-machined workpiece is transferred to the clamping apparatus of the other pallet and either brought back to the machining position later or first removed with the other pallet, wherein the transferred workpiece is then already positioned in a re-clamped manner on the other pallet, so that this time-consuming and laborious, previously manual, step is no longer necessary.

An essential advantage of the method is therefore that the workpiece switch can be carried out quickly and, above all, automatically and unmanned.

In the system, the multiple movement options of the pivot arms and the pallet supports that can be rotated on them are also used to prepare and carry out the automatic transfer without manual intervention.

In the method and with the system, the transfer can take place with the workpiece and pallets in a horizontal or at least essentially vertical position, wherein the horizontal position is to be given preference.

With the help of a positioning device of the pallet support, a further pallet, preferably horizontally positioned there, can be aligned with its clamping apparatus relative to the clamping abutments of the semi-machined workpiece. The semi-machined workpiece with the pallet is in a horizontal transfer position so that the machined side of the workpiece faces the further pallet on the pallet transport device. Then the workpiece is transferred by a relative lifting and/or lowering movement between the further pallet and the pallet onto the clamping apparatus of the further pallet and released from the pallet. Thus, after transfer, the semi-machined workpiece lies in the re-clamped position on the further pallet, without any external intervention being required here. The relative lifting and/or lowering movement can be generated linearly by means of the positioning device of the pallet support, in order to bring the clamping apparatus of the further pallet with the clamping abutments into engagement in a straight line by lifting the further pallet and to place the further pallet with the transferred workpiece back onto the support. Alternatively, the pallet with the semi-machined workpiece can be lowered from the machining position to the transfer position by means of the pivot arms and pallet supports, so that the clamping apparatus of the other pallet and the clamping abutment of the workpiece can be brought together in an arc movement around the pivot axis of the pivot arms.

However, it is expedient to initially keep the pallet at a distance above the other pallet in the horizontal transfer position. To transfer the workpiece, the other pallet is aligned with the workpiece and only then, or while doing so, is it lifted in the direction of the pallet's transfer position. Then the workpiece clamping apparatus of the other pallet engages with the clamping abutments of the workpiece, and the fixation of the workpiece to the pallet is released. The workpiece is transferred and the pallet is emptied. The lifting movement is linear in order to achieve a clean engagement of the clamping apparatus with the clamping abutments. This variant is to be preferred.

Alternatively, the turned pallet with the semi-machined workpiece, the machined side of which faces downwards towards the other pallet, could be lowered into this lower transfer position by means of the pivot arms and pallet supports until the workpiece is transferred to the clamping apparatus of the other pallet. In this case, the clamping apparatus of the other pallet is joined to the clamping abutments on the workpiece with an arc movement around the pivot axis of the pivot arms, provided that the clamping apparatus and the clamping abutments can be properly engaged with each other in this way.

Furthermore, it is expedient to pivot up the emptied pallet in the horizontal machining center out of the movement path of the other pallet with the workpiece, before the other pallet is removed, in order to avoid collisions.

After the further pallet with the workpiece has been removed, e.g. by means of a bottom-side transport device combined with the support, the emptied pallet is turned until its set-up side is facing upwards and deposited. Subsequently, the emptied pallet can be conveyed away, e.g. by means of the pallet transport device, preferably to a set-up station where it can be equipped with a new blank, or to a pallet stock.

The removed further pallet can be returned to the horizontal machining center with the workpiece for machining the other side of the workpiece, or to another horizontal machining center, or to a pallet stock, e.g. a pallet rack. In principle, blanks, finished parts and, if necessary, semi-machined parts are always moved with pallets in this method variant.

According to the method, it is expedient to carry out the workpiece switch and, if necessary, even the supply and removal of blanks and finished parts in the system in an automatically controlled manner, so that the steps run quickly unmanned and no auxiliary equipment is needed.

In another method variant, blanks and finished parts are supplied and removed separately, i.e. without pallets, from and to the top.

In this case, only two pallets need to be used alternately.

In an expedient embodiment of the system, in the horizontal transfer position, a distance is adjustable between the pallet and the further pallet, which the aligned further pallet traverses for the transfer of the workpiece in a linear lifting movement of the support. In this way, the clamping apparatus is reliably brought together with the clamping abutments. However, the system can also be adapted such that in the further lowered transfer position, the workpiece comes into contact with the further pallet and is transferred.

In an expedient embodiment, the clamping apparatus of the further pallet has hydraulically actuated bore clamps. The clamping abutments of the workpiece are bores or blind bores in the workpiece, which are produced, for example, during machining, and which are used to engage the bore clamps. Such bore clamps have, for example, expandable mandrels and stops for the workpiece. However, other types of clamping apparatus can also be used, provided that they can handle large masses and ensure high precision.

To be able to carry out the workpiece switch automatically, it is expedient for the system to have at least one control system, preferably a programmable one, that is linked to the drives of the pivot arms, the pallet supports and the positioning device of the pallet support or even the supporting device.

In one embodiment, the pallet support can be combined with a transport device, e.g. a roller conveyor, for example with driven rollers, or a bottom-side rail-carriage unit, for maneuvering only the pallets.

Particularly important is a configuration of the system with a carrying device for the separate supply and removal of blanks and finished parts from and to the top of and out of the machine. This carrying device can be, for example, a lifting gear or a robot or a movable carrying frame.

When workpieces are supplied and removed in a vertical or almost vertical (slightly inclined) position with the workpiece side parallel to the machining area in the machine, with or without a pallet on the bottom-side transport device, it is expedient to provide a horizontal positioning device in the transport device or support in order to make it easier to bring the workpiece into and out of the machine.

BRIEF DESCRIPTION OF THE FIGURES

The subject matter of the invention is explained on the basis of the drawings. It is shown by.

DETAILED DESCRIPTION

Figure 1:
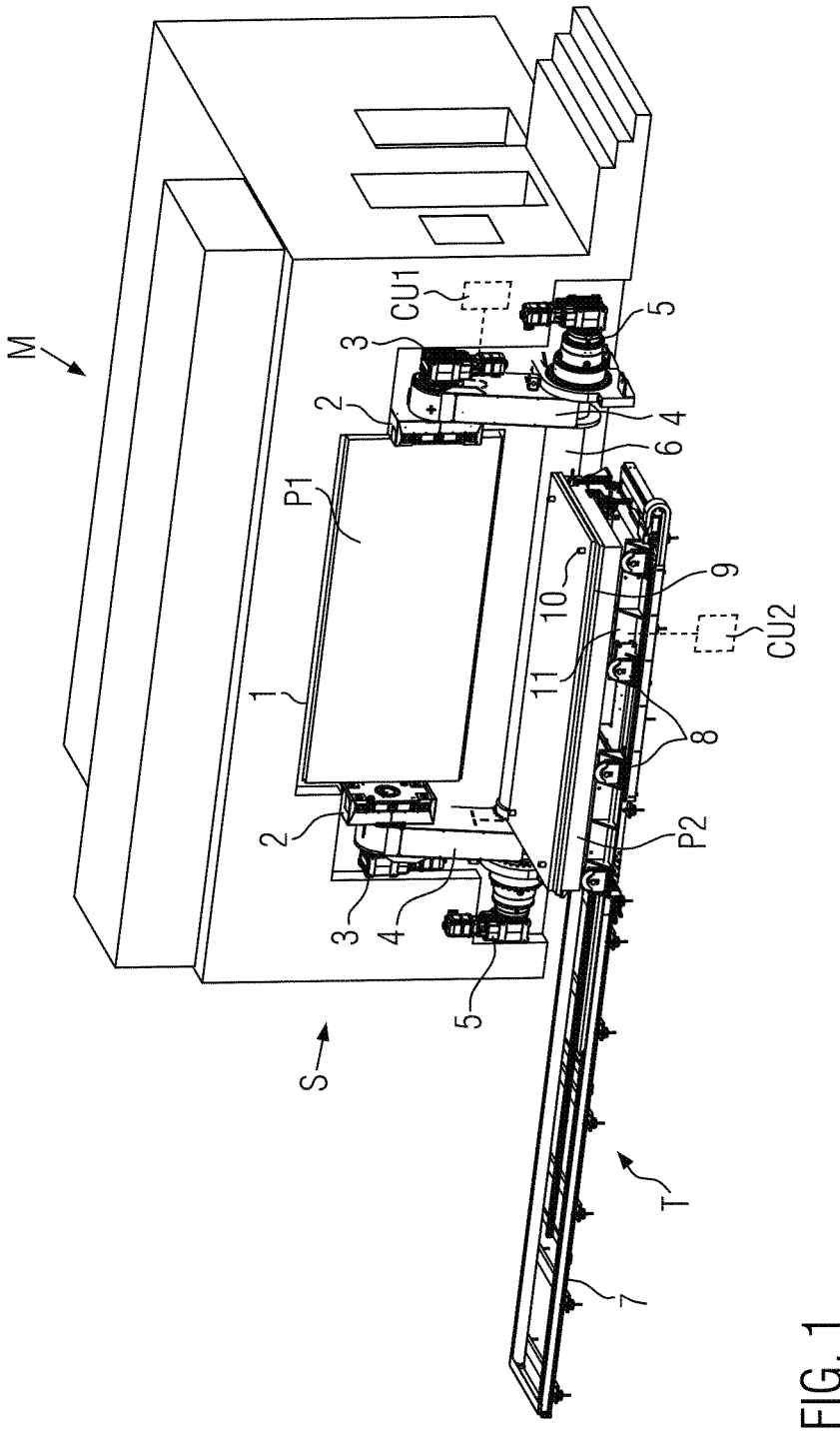
FIG. 1 a schematic perspective view of a horizontal machining center with a pallet manipulation system for a workpiece switch, in a phase in which a workpiece is currently being or has just been machined, FIG. 2 another phase at the beginning of a workpiece switch, FIG. 3 another phase before the workpiece switch, FIG. 4 a phase when the workpiece switch is completed, FIG. 5 a phase after the workpiece switch, FIG. 6 another phase before the removal of the switched workpiece, FIG. 7 the removal of the switched workpiece, FIG. 8 a phase before the removal of the emptied pallet FIG. 9 a phase during the removal of the emptied pallet, FIG. 10 the removal of the emptied pallet, FIG. 11 the supply of a new or switched workpiece, FIG. 12 another embodiment of the system, and FIG. 13 another embodiment of the system for carrying out a further variant of the method.

In FIG. 1, a workpiece that is not visible in FIG. 1 and that is fixed on a pallet P1 is machined, e.g. by metal cutting, in a machining area 1 in a horizontal machining center M. The pallet P1 is fixed in the machining area 1 in the shown approx. vertical working position. The workpiece is to be machined on both sides and must therefore be switched or re-clamped after machining one side in order to also be able to machine the other side.

A system S is provided on the horizontal machining center M, which is used to manipulate pallets, e.g. P1. The system S comprises two parallel and synchronously pivotable pivot arms 4 with drives 5, at the free ends of which a pallet carrier 2 is rotatably mounted and driven by means of a drive 3. The pallet carriers 2 hold the respective pallet P1 with engagement elements, not shown, at both front ends and serve to turn the pallet P1 on the pivot arms 4, while the pivot arms 4 are provided for pivoting the pallets by approx. 90°. The pivot arms are coupled to one another in a torque-proof manner, for example, via a transverse shaft 6.

The system S also includes a pallet support T, which is arranged in front of the horizontal machining center M. In the non-limiting case shown, it is a rail-carriage unit with a rail section 7 on which, for example, carriages 8 can be moved. In the pallet support T, for example at or near carriage 8, a positioning device 11 is provided, which serves to horizontally align a further pallet P2 lying horizontally on the carriage 8, i.e. in a direction corresponding to the travel distance 7 and in a direction perpendicular to it, and also to linearly raise and lower it vertically (arrows 11'). On the further pallet P2, a clamping apparatus 9 is provided, which for example has several bore clamps 10 that can be actuated hydraulically for fixing and holding a workpiece. The drives 3, 5 and the positioning device 11 are connected, for example, to separate, preferably programmable, control systems CU1, CU2 or to a common control system, in order to carry out, for example, by means of the system S, at least one unmanned automatic workpiece switch, as shown in the following Figures.

In FIG. 1, a fixed pallet P1 is shown in the machining area 1. The pallet carriers 2 are configured such that they can hold two pallets back to back at the same time, for example to shorten the changeover time from a machined workpiece to a workpiece to be machined. The pallet carriers 2 engage with devices (FIG. 11, engagement elements 16, 17) not shown in more detail, but indicated here in two ways, in the front sides of the pallet to be manipulated, so that each pallet can be individually placed in the horizontal machining center M and removed from it.

The second pallet P2 shown in FIG. 1 is provided on the support T, e.g. a table, in order to receive the at least one semi-machined workpiece W from the pallet P1.

Figure 2:
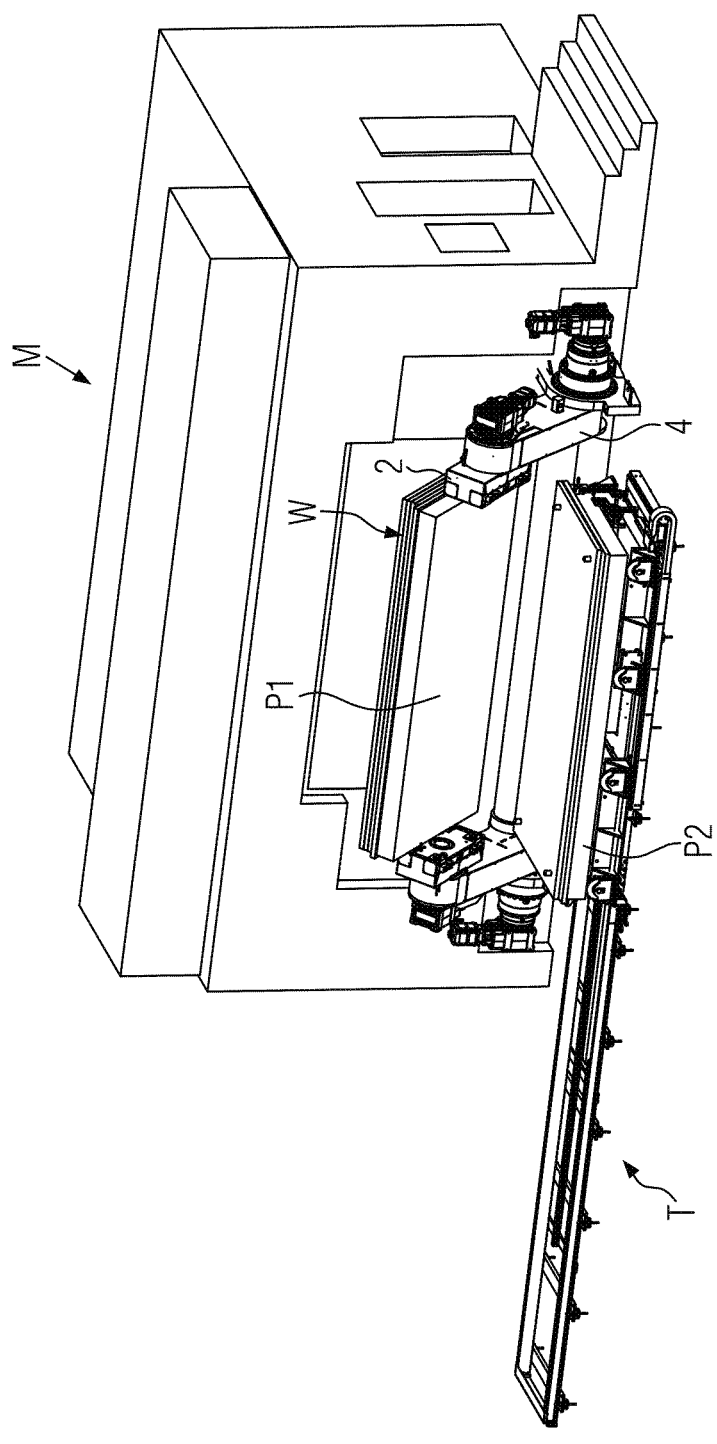

In FIG. 2, the pallet P1 on which the workpiece W is fixed is pivoted by means of the pivot arms 4 in the direction of the pallet support T or the other pallet P2 after machining has been completed. The workpiece W still has the machined side facing the horizontal machining center M.

Figure 3:
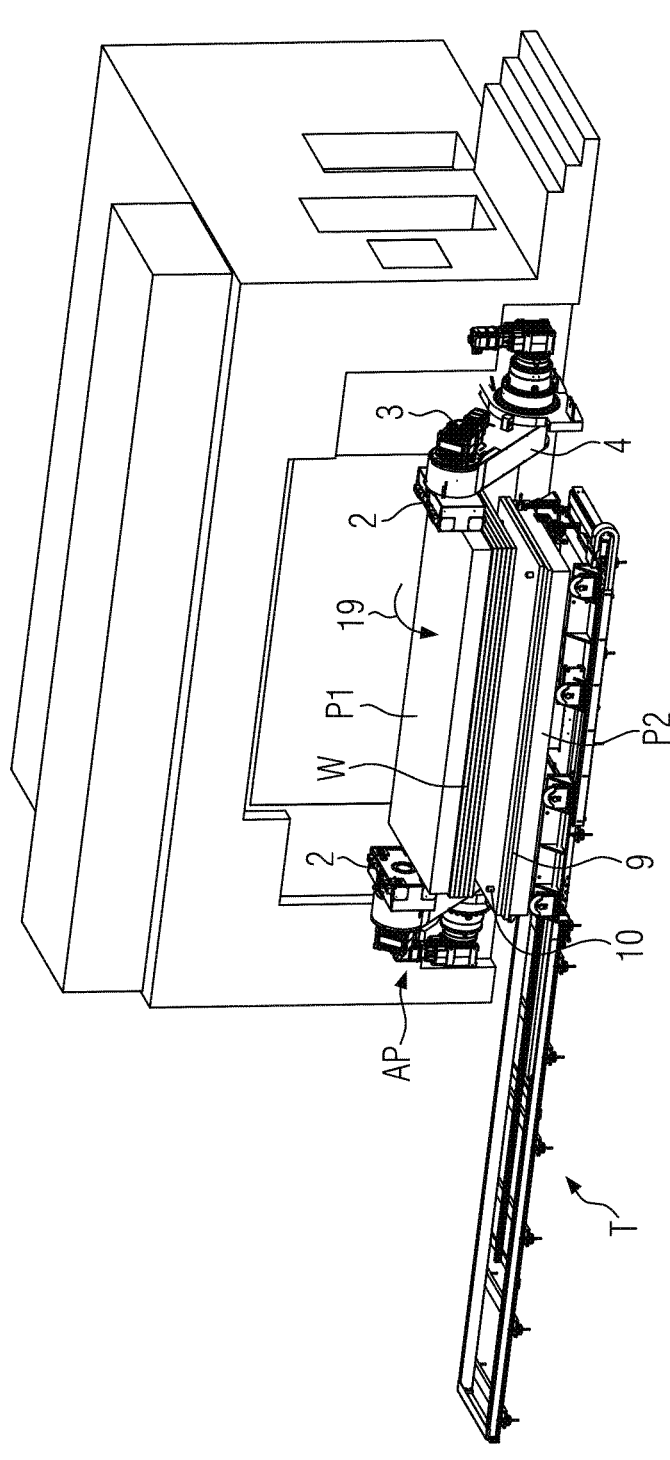

In the next phase, according to FIG. 3, the pallet P1 has arrived in a turned horizontal transfer position AP and is fixed, namely by pivoting the pivot arms 4 and turning the pallet carriers 2 on the pivot arms 4 (arrow 19), according to a non-limiting process variant. In this transfer position AP, the machined side of the workpiece W, now facing the other pallet P2, is at a vertical distance from the clamping apparatus 9 of the other pallet P2.

Figure 4:
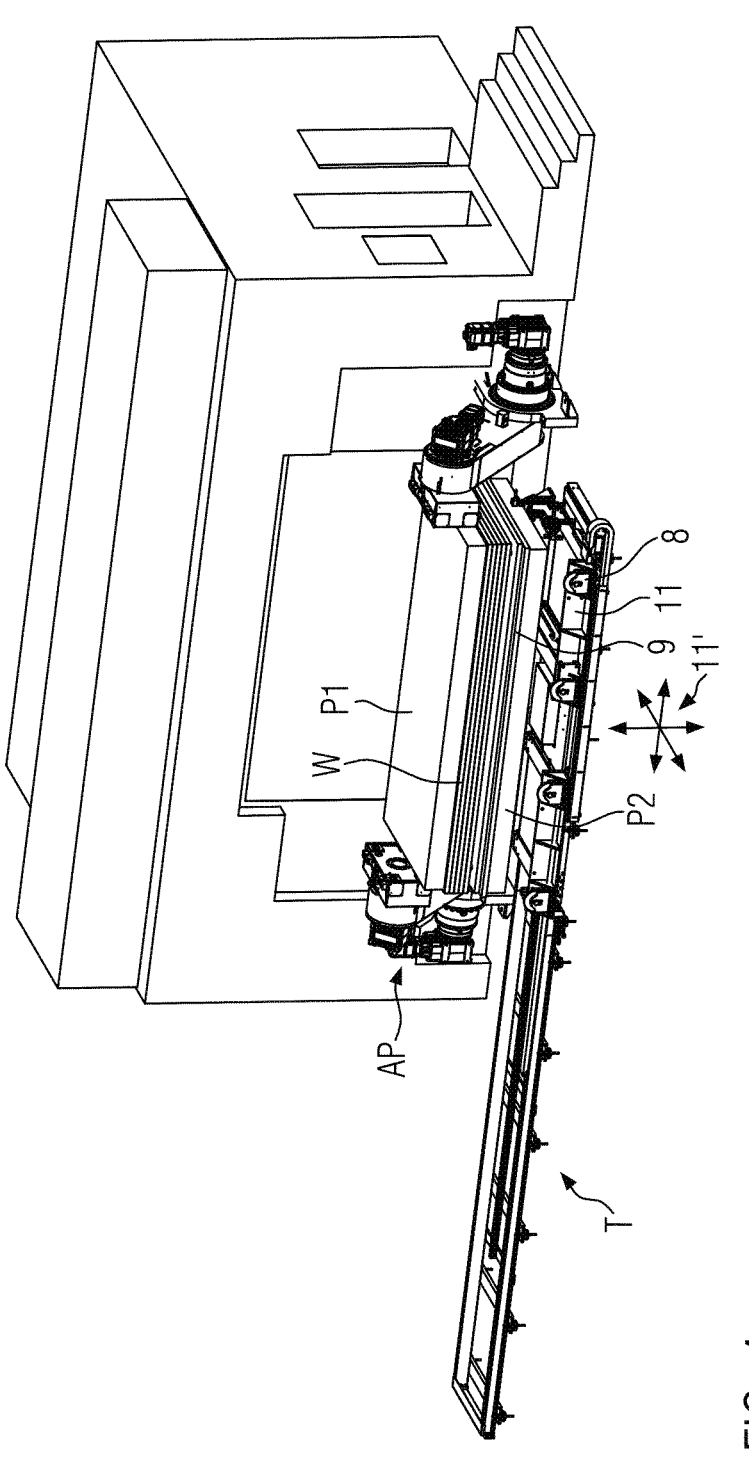
Figure 6:
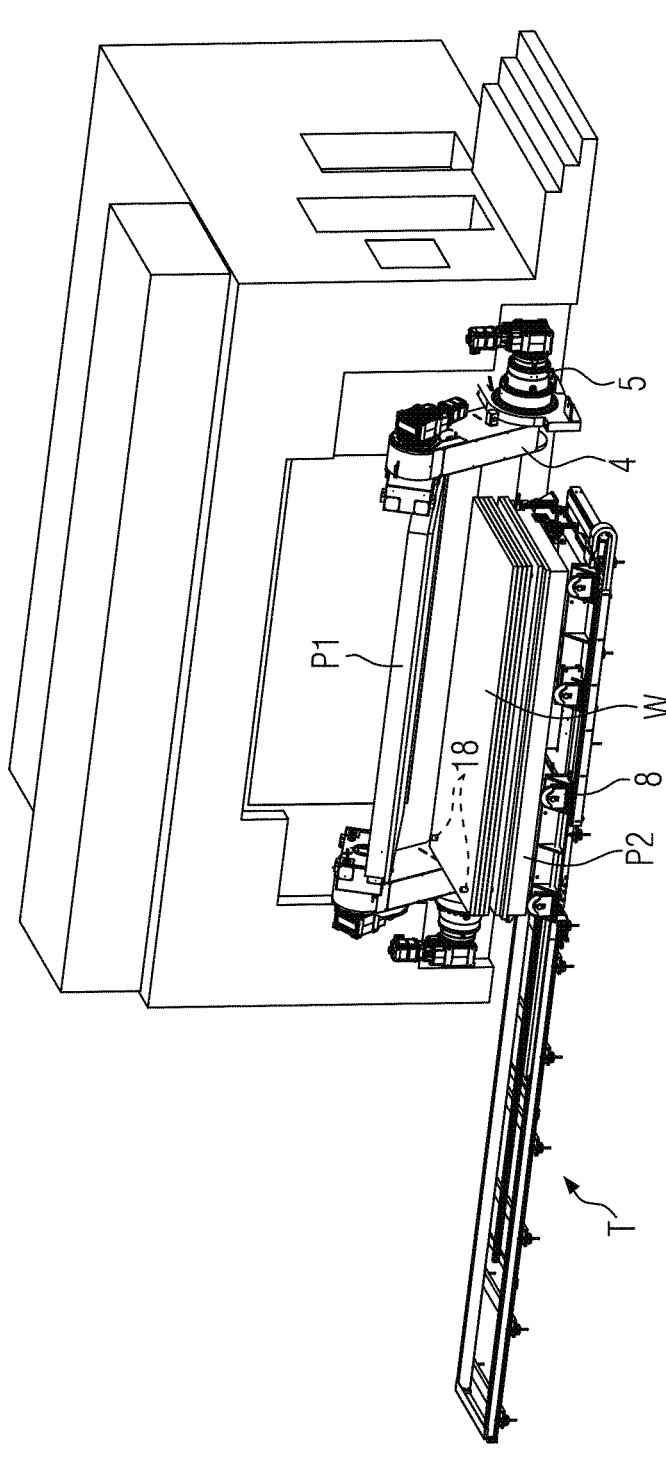

According to FIG. 4, the further pallet P2 is aligned by means of the positioning device 11 of the carriage 8 such that the clamping apparatus 9 is aligned, for example, with engagement elements 10 in the form of bore clamps that can be actuated hydraulically of the further pallet P2 on the clamping abutment 18 (in FIG. 6, indicated by dashed lines, drilled during machining or as blind holes) of the workpiece W. Furthermore, the further pallet P2 is lifted vertically in the direction of the arrows 11' until the clamping apparatus 9 of the further pallet P2 has engaged with the clamping abutments 18 of the workpiece W, whereupon the fixing of the workpiece W to the pallet P1 is released and the workpiece is transferred to the further pallet P2, in such a way that the machined side points to the set-up side of the further pallet P2 without contact with the further pallet P2.

Figure 5:
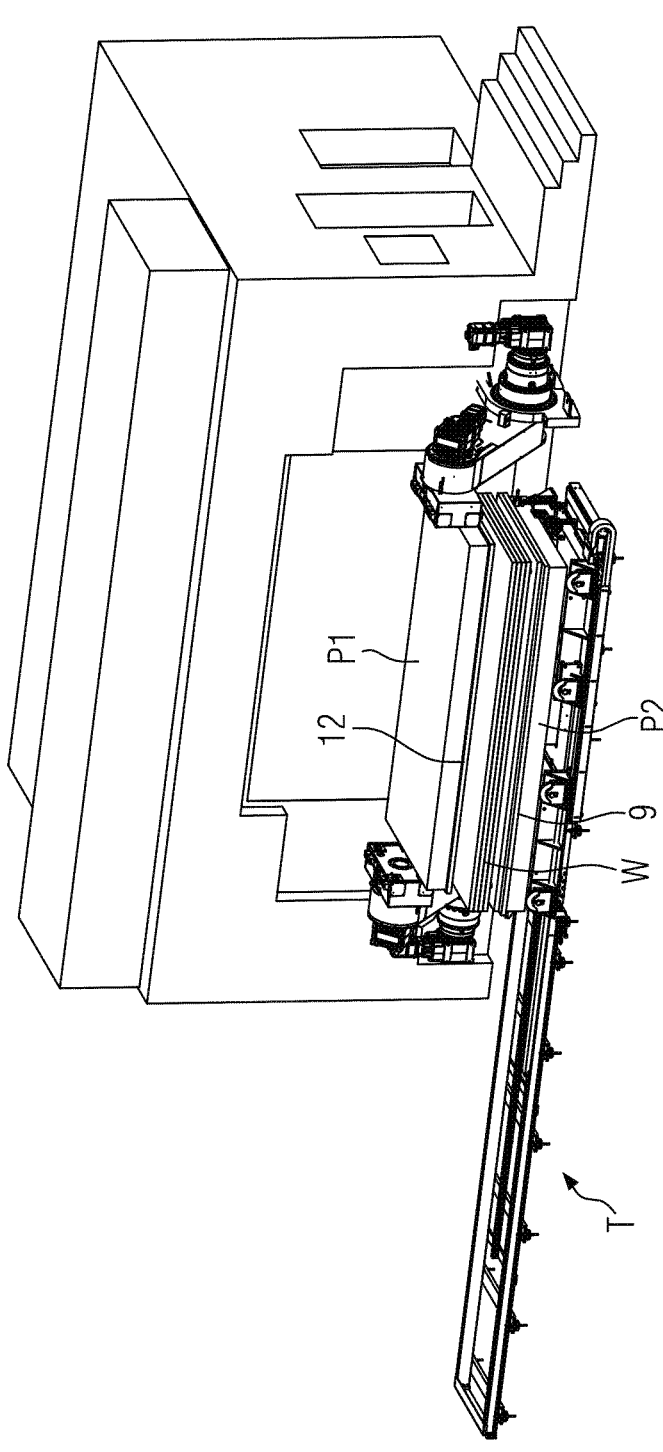

In the next phase, as shown in FIG. 5, the further pallet P2 with the transferred workpiece W is lowered onto the support T, so that the emptied free pallet P1, the set-up side of which is indicated by 12, allows the further pallet P2 to be removed. However, the pivot arms 4 still obstruct the path of movement of the other pallet 2, so that, according to FIG. 6, the pivot arms 4 with the pallet P1 are first moved upwards out of the path of movement of the other pallet P2 in the pallet transport device P. Only then, in accordance with FIG. 7, the further pallet P2, with the workpiece W fixed on it, the non-machined side of which is identified by 13, is removed, for example to a set-up station R or a pallet stock, or again to the same or another horizontal machining center M, in order to also machine the side 13 of the workpiece W. The machined side of the workpiece W, which faces the further pallet P2, is indicated by 14 and is at a distance 15 from the further pallet P2, namely over the clamping apparatus 9 of the further pallet, e.g. the engaged bore clamps 10, which are hydraulically spread in the clamping abutments 18, e.g. bores or blind bores in the workpiece W, and can also have stops for the workpiece W, which support the clamped workpiece.

The process, explained with reference to FIGS. 3, 4 and 5, during the transfer of the workpiece W to the further pallet P2 and the temporary removal of the latter, is, as mentioned, a non-limiting method variant. One advantage of this method variant is that the clamping apparatus 9 can be engaged with the clamping abutments 18 of the workpiece W in a straight vertical movement.

If, however, the clamping apparatus 9, 10 of the further pallet and the clamping abutments 18 of the workpiece also do not tolerate exactly linear converging movements, then the pallet P1 does not need to be stopped in the transfer position AP shown in FIGS. 3 to 5, but the pallet P1 can be lowered further by means of the pivot arms 4 until the workpiece W comes into contact with the clamping apparatus 9, 10 of the other pallet P2 in this lower transfer position (not shown) and thereby held horizontally by means of the pallet carriers 2. Converging the clamping apparatus 9, 10 and the clamping abutment 18 then occurs with an arc movement around the pivot axis defined by the pivot arms 4 in the system S.

Figure 7:
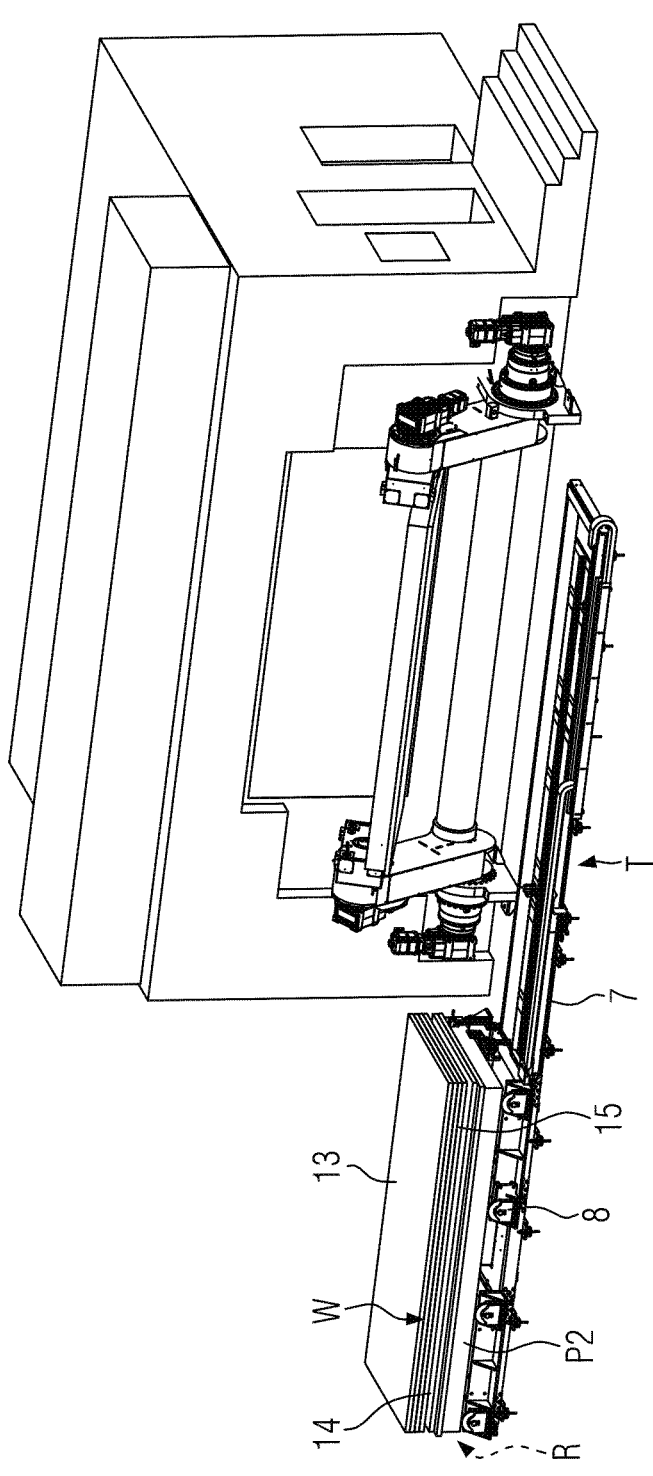
Figure 8:
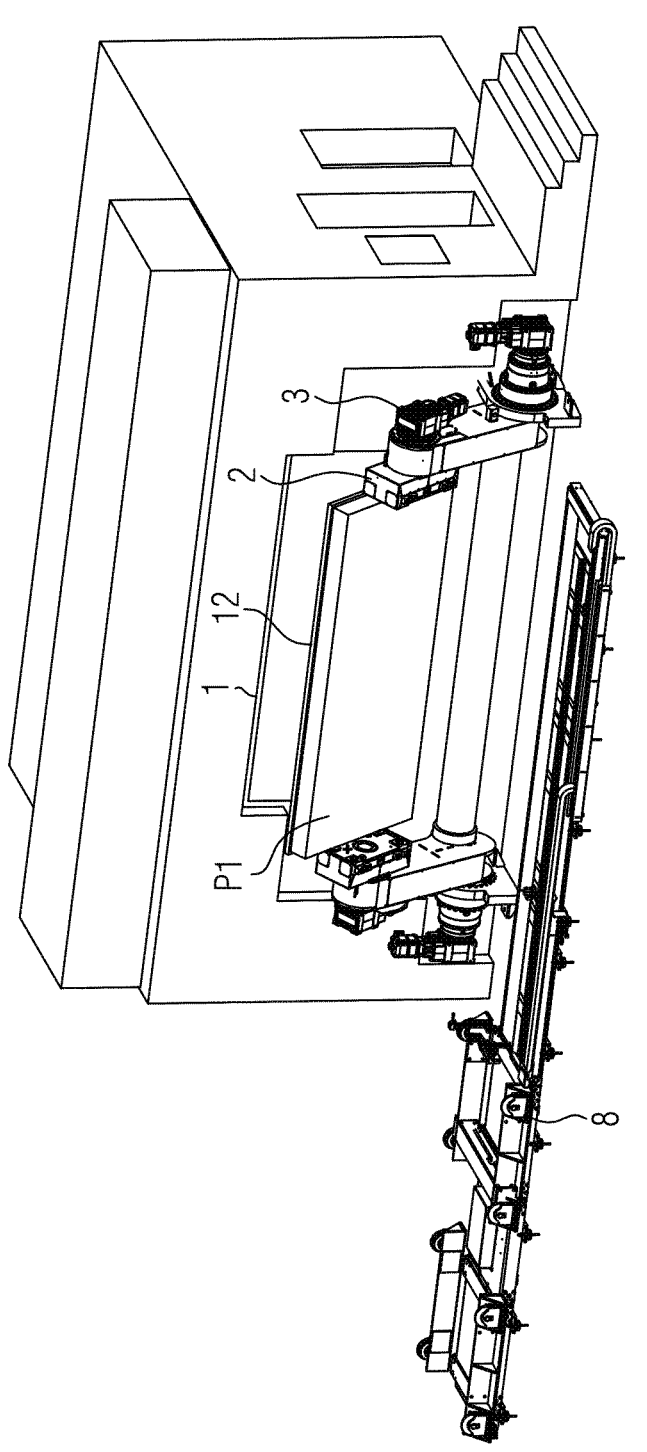
Figure 9:
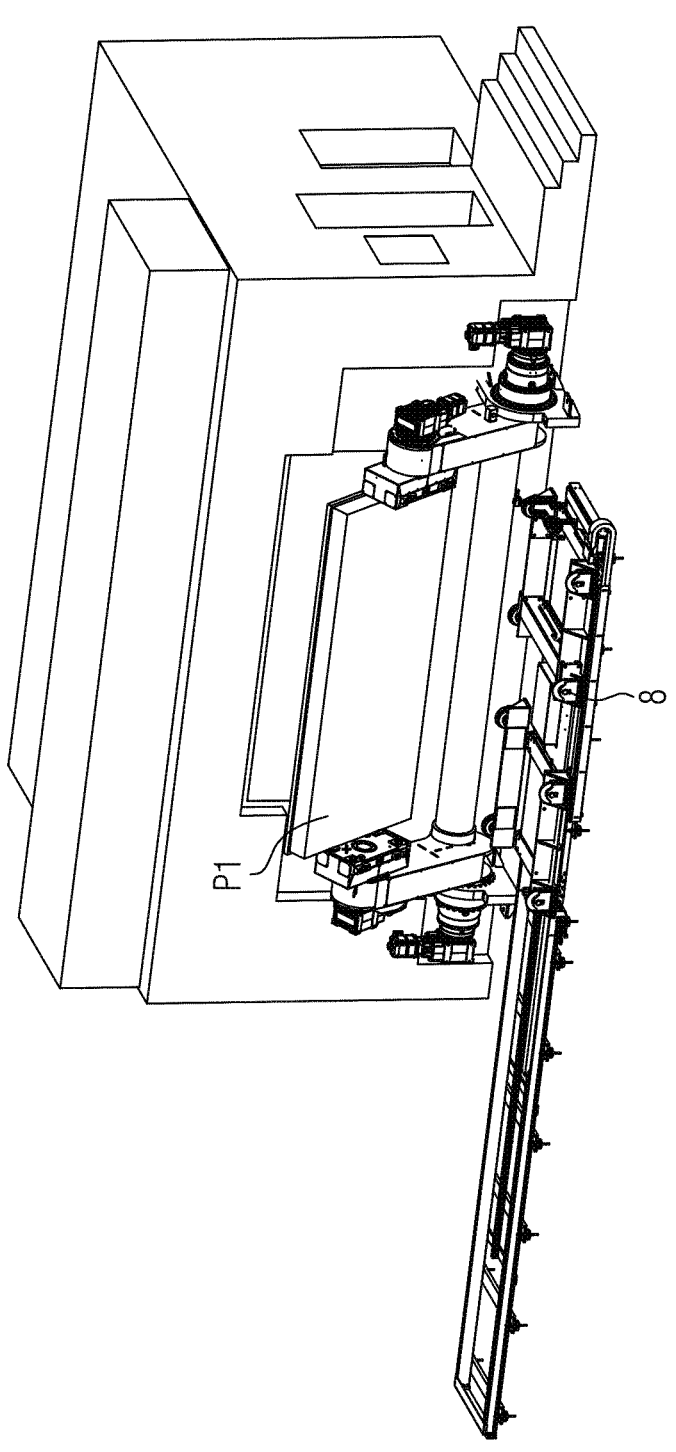
Figure 10:
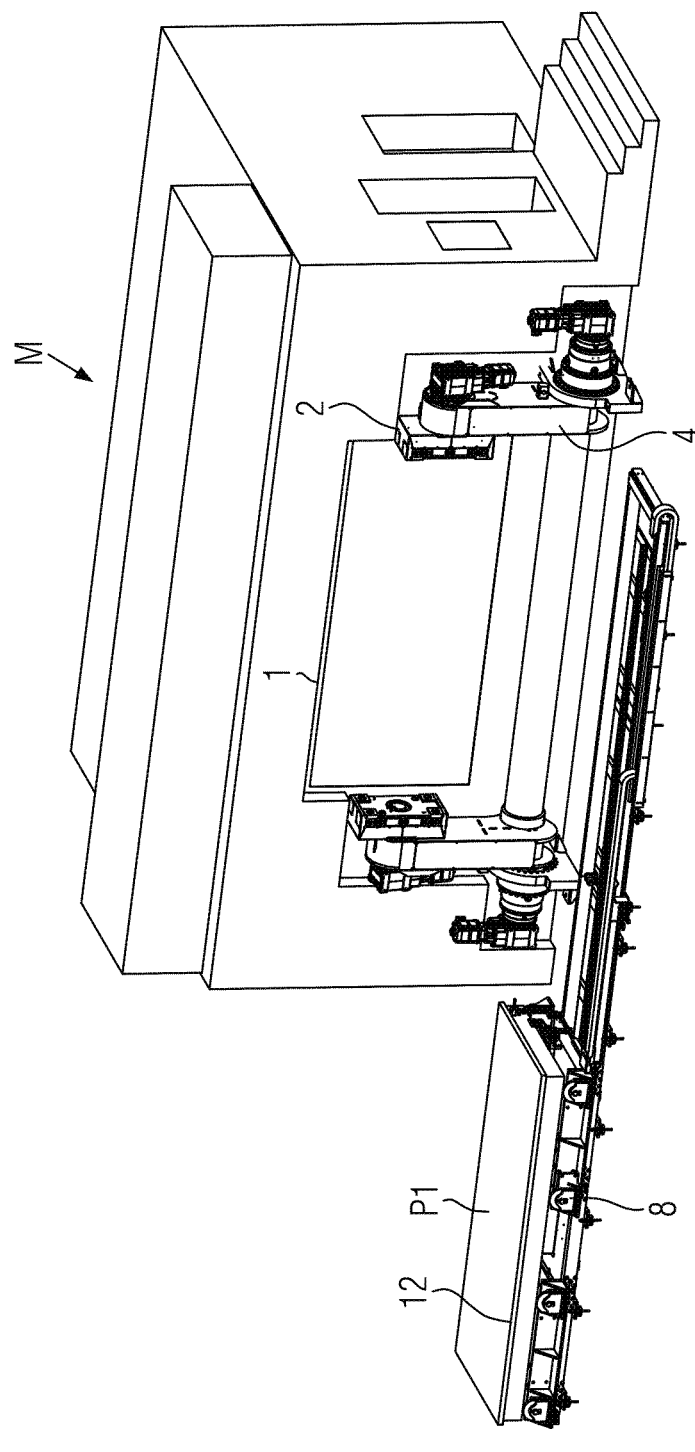
Figure 12:
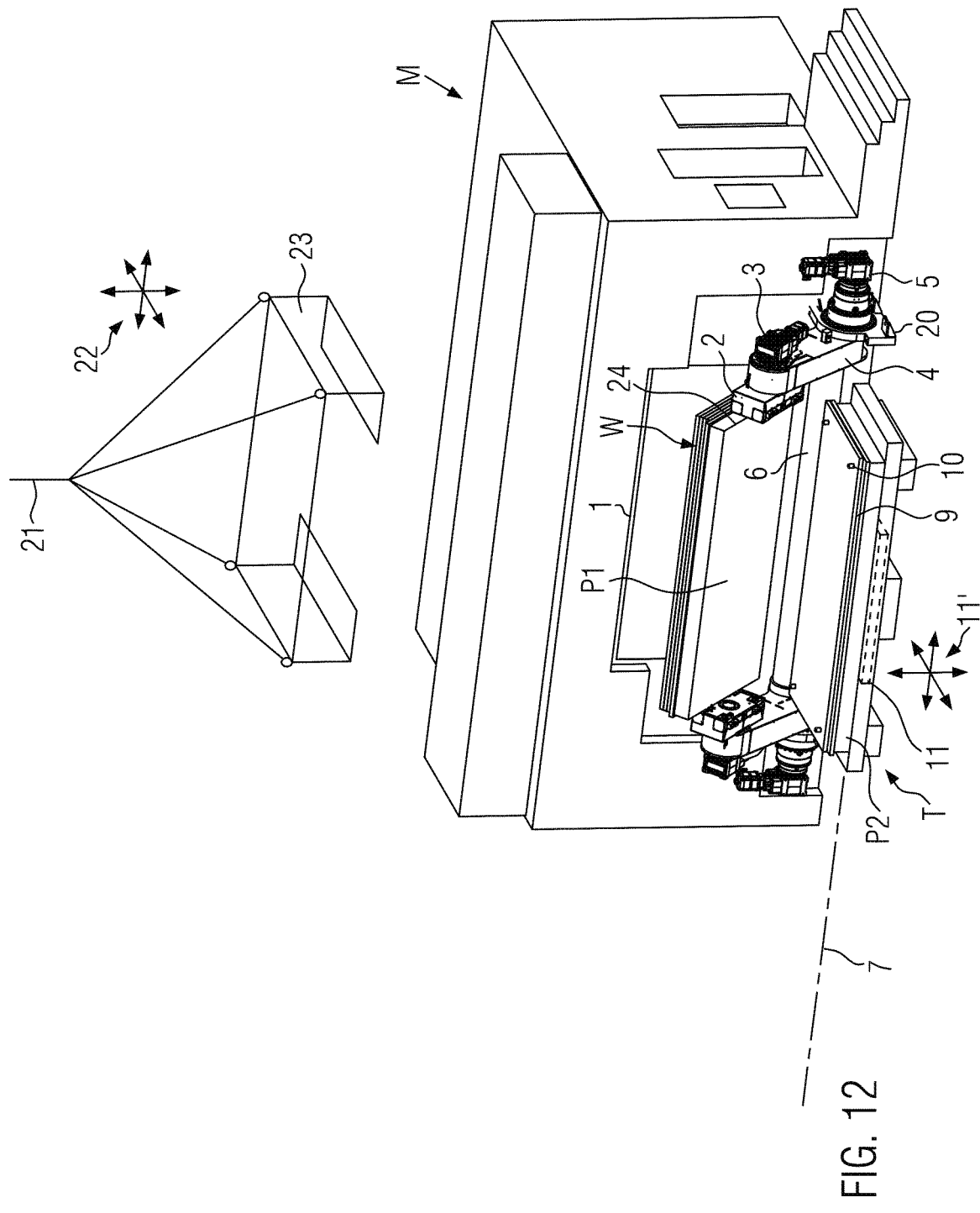

After the phase of FIG. 7, a new further pallet P2 with either a workpiece that has not yet been machined or with a semi-finished workpiece could be supplied and in a turned manner back to back with the still present emptied pallet P1 in the machining area 1 of the horizontal machining center M be transferred and fixed (not shown), and/or the previously during the switch emptied pallet P1 can be subsequently, as shown in FIGS. 8 to 10, removed or as shown in FIG. 12 deposited on the support T.

Namely, the emptied pallet P1 can be removed from the horizontal machining center M via the carriages 8, as shown in FIGS. 8, 9 and 10. The removed, emptied pallet P1 can be transported to a set-up station (not shown) in order to again clamp a blank as a workpiece, or to a pallet stock. According to FIG. 10, the pivot arms 4 can be pivoted up, so to speak, into a ready position and the pallet carriers 2 can also be aligned in order to take over a pallet delivered later. After that, a new machining cycle can begin.

Figure 11:
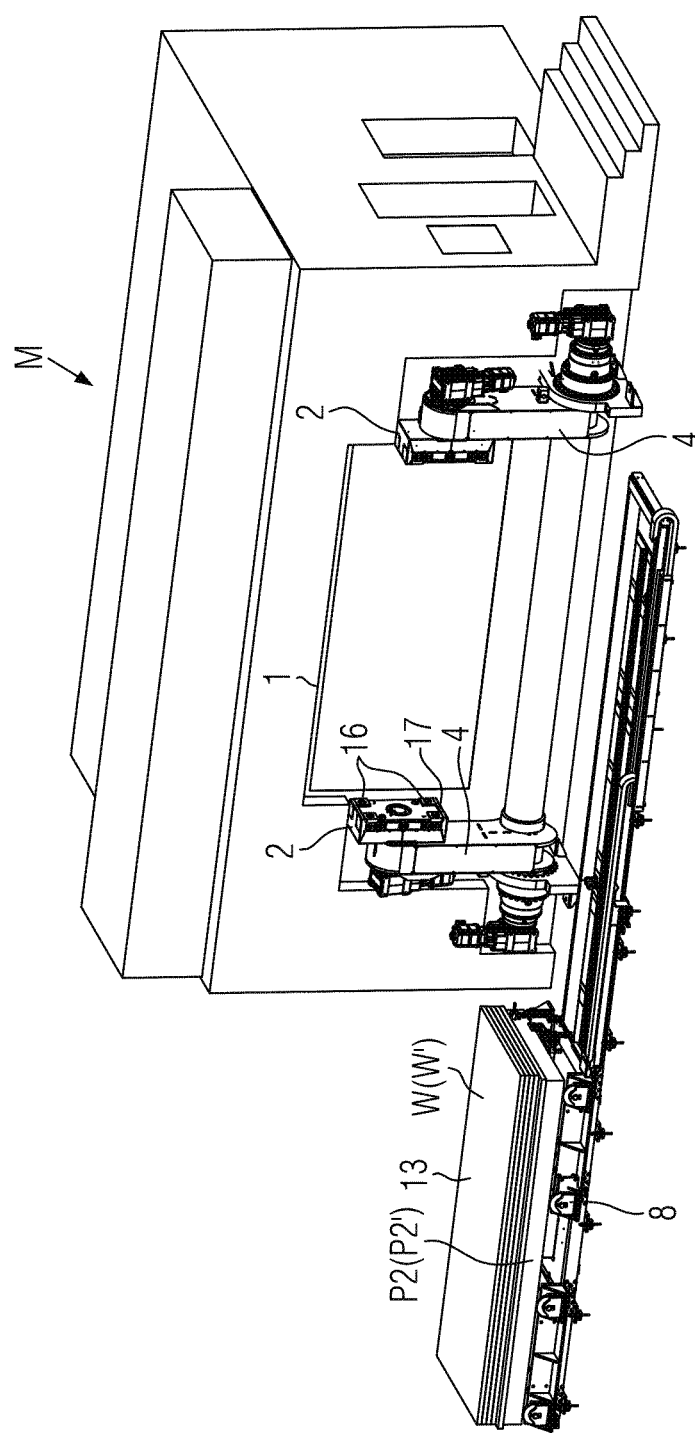

The further pallet P2 on the carriage 8, as indicated in FIG. 11, is, for example, the previously removed further pallet P2, on which the workpiece W is fixed with the as yet unmachined side 13 facing upwards. However, it could also be another further pallet P2', on which another workpiece W' not yet machined on side 13 is fixed, or a blank.

With the method shown in FIGS. 1-11, blanks, semi-finished parts and finished parts are transported on pallets P1, P2, P1'.

The further pallet P2 conveyed away in accordance with FIG. 7 with the semi-machined workpiece W could alternatively also be transferred to another horizontal machining center not shown for further machining.

The bore clamps 10 and the clamping abutments 18 on the workpiece W, described as the clamping apparatus 9, are just one non-limiting option for the configuration of the clamping apparatus of the further pallet P2. Any other clamping apparatus can be provided on the pallet P2, which is able to carry the relatively high weight of the workpiece W and, if necessary, to support it stably during machining in the horizontal machining center M.

The explained system S for manipulating the pallets P1, P2 is referred to in this technique as the "automation" of the horizontal machining center M.

In the further embodiment of the system shown in FIG. 12, blanks and finished parts are each supplied and removed separately by means of a carrying device 21 (e.g. a lifting gear or robot or carrying frame) functionally assigned to the horizontal machining center M, with gripping elements 22 for holding the blanks and also the finished parts, e.g. with vertical movements (arrows 21'), and in the process only the two pallets P1, P2 are used alternately, onto which blanks are supplied from above and from which finished parts are removed upwards. The carrying device 21 is only indicated schematically and in practice may be configured differently than shown, e.g. with clamping apparatuses similar to those of the pallets P1, P2.

The support T can be a table with the positioning device 11, to which a transport device 7 can be assigned for easier handling of the pallets P1, P2. The pivot arms 4 can be supported on brackets 20 on the bottom side in FIG. 12.

In FIG. 12, the pallet P1 with the blank is pivoted into the machining area 1 and fixed. The further pallet P2 is ready for the described transfer on the support T. After the transfer, the empty pallet P1 is fixed in the machining area 1 and the further pallet P2 is picked up, turned and brought with its back to the back of the pallet P1, until both pallets are hanging on the pallet carriers 2 and turned together, so that now the further pallet P2 can be brought into the machining area 1 and fixed, after which the empty pallet P1 is turned alone and deposited on the support T and receives a new blank from the carrying device 21. Similarly, the second pallet P2 is manipulated for the transfer of the semi-finished part and for picking up the finished part, which is then to be removed from the carrying device 21. This is a non-limiting example of the process of a cycle when using the carrying device 21. The carrying device 21 could alternatively handle blanks and finished parts, each in a vertical or almost vertical position, that is, with the sides of the workpiece essentially parallel to the machining area 1 of the machine M, in the case of a cuboid or plate-shaped workpiece W.

Figure 13:
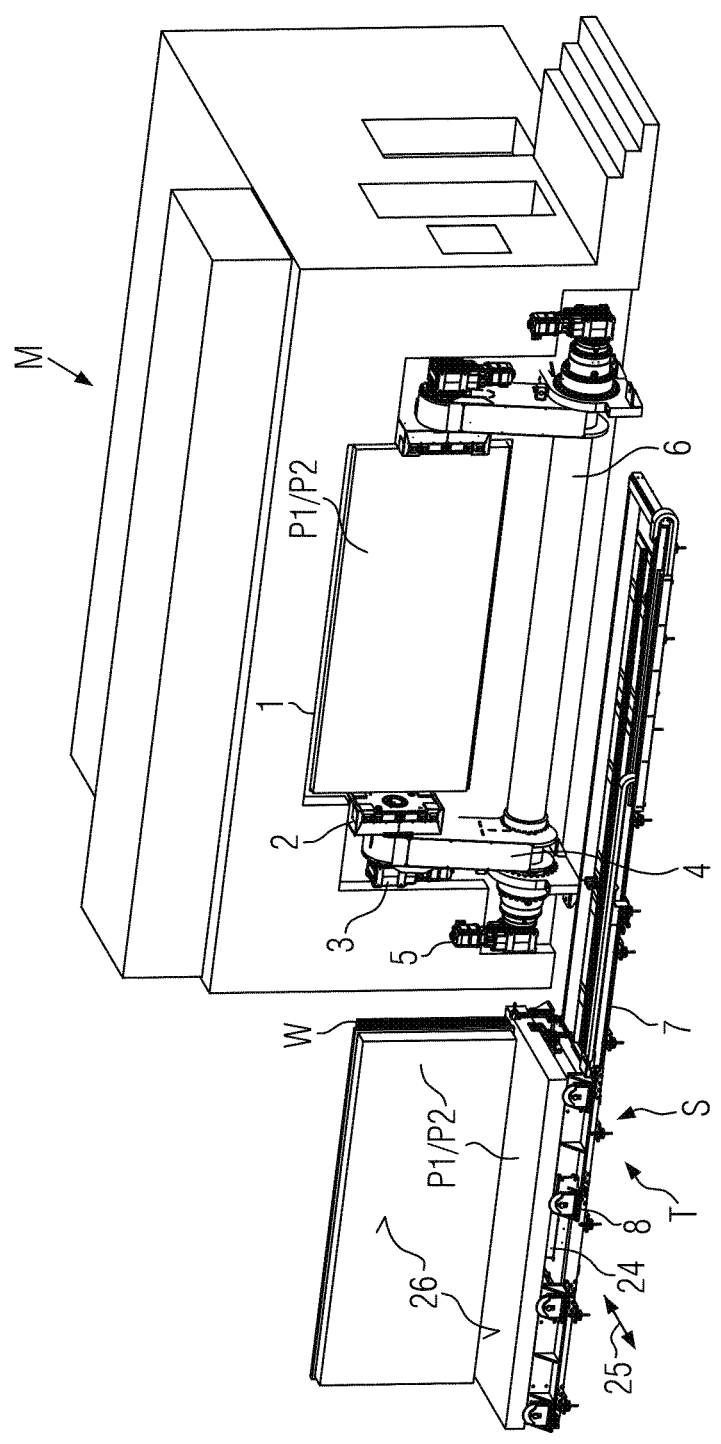

FIG. 13 shows an embodiment of system S, with which the method can be carried out with the supply and removal and, if necessary, the transfer of the semi-machined workpiece to the further pallet P2 in an at least essentially vertical position of the workpiece W. The workpiece W shown is located during supply and removal with the transport device 7, e.g. vertically, as shown, on the carriages 8, e.g. supported by an L-shaped frame 26 or L-shaped arranged pallets P1, P2, and, during the feed, is either transferred separately to a pallet vertically placed on the pivot arms 4, held on the pallet carriers 2, or together with the pallet from the support T to the pallet carriers 2. For removal, the semi-finished or finished part is handed over in a vertical position, either to the frame 26 or to the L-shaped pallets P1, P2. The transfer of the workpiece to the machine M or from the machine M to the support T can be supported in each case by a horizontal positioning device 24, for example the carriage 8 of the support T of the transport device 7, which generates horizontal movements (double arrow 25).

The pallet P1 can have holding and clamping devices 24 (e.g. lever grippers) especially for the blanks, if necessary with vacuum support; the further pallet P2, on the other hand, can have the aforementioned clamping apparatus 9, which fits the semi-finished and finished parts with their clamping abutments 18.

The invention claimed is:

1. Method for switching at least one workpiece which is fixed on a pallet and is to be machined on both sides, comprising:

after one workpiece side has been machined on a horizontal machining center, displacing the pallet for the workpiece switch with the semi-machined workpiece from a substantially vertical machining position in the direction towards a pallet support via a system; and during displacement into a transfer position, moving the pallet until the machined side of the workpiece points in the direction of the pallet support, wherein a further pallet having a workpiece clamping apparatus is provided on the pallet support, and wherein transferring the workpiece to the clamping apparatus and returning to the machining position or removing with the further pallet.

2. Method according to claim 1, further comprising:

bringing the pallet for switching the workpiece either relatively to the horizontally lying further pallet provided on the pallet support into the horizontally lying transfer position with the machined side of the workpiece pointing downwards, or relatively to the further pallet, which is provided at least substantially vertically standing, for switching into the at least substantially vertically standing transfer position with the machined side of the workpiece facing outwards.

3. Method according to claim 2, wherein the respective workpiece configured as a blank and/or semi-finished and/or finished part is supplied and/or removed either on the bottom or from and toward the top of the horizontal machining center in an at least substantially vertical position with the workpiece side approximately parallel to the machining area of the machine.

4. Method according to claim 2, further comprising:

initially holding the pallet in the horizontal transfer position at a distance above the further pallet, wherein the further pallet for transferring the workpiece is aligned on the workpiece and lifted in the direction of the transfer position of the pallet.

5. Method according to claim 2, further comprising:

lowering the pallet into the transfer position for the transfer of the workpiece to the clamping apparatus of the further pallet lying horizontally on the pallet support and aligned with the workpiece.

6. Method according to claim 2, further comprising:

removing the further pallet with the semi-machined workpiece from the machine; and pivoting the emptied pallet up out of the removal movement path of the further pallet before the further pallet is removed.

7. Method according to claim 6, further comprising:

after the further pallet with the semi-machined workpiece has been removed, turning the emptied pallet until a set-up side of the emptied pallet points upwards and is then deposited on the pallet support and conveyed away.

8. Method according to claim 7, further comprising:

transferring the further pallet removed back to the horizontal machining center or to another horizontal machining center or to a pallet stock for machining the other side of the workpiece.

9. Method according to claim 1, further comprising:

supplying workpieces in the form of blanks separately from above by means of a carrying device functionally assigned to the horizontal machining center; and lifting off the workpieces separately upwards and removing the workpieces as finished or semi-finished parts.

10. Method according to claim 1, wherein the machining is carried out using only two pallets alternately, of which the pallet is equipped with clamping apparatuses that fit blanks and the pallet is equipped with a clamping apparatus that fits semi-finished and finished workpieces.

11. Method according to claim 1, wherein the system is used with two pivot arms that can be pivoted up and down, pallet carriers that can be rotated thereon for turning the pallets, and the pallet support arranged in front of the horizontal machining center.

12. System configured to carry out the method according to claim 1, wherein via the system, a pallet carrying a semi-machined workpiece can be displaced from a substantially vertical machining position towards a pallet support for the workpiece switch, wherein the pallet is moved into a transfer position such that the machined side of the workpiece points in the direction of the pallet support, that a further pallet having a workpiece clamping apparatus is provided on the pallet support, and that the workpiece can be transferred to the workpiece clamping apparatus and can be transferred or conveyed back to the machining position with the further pallet.

13. System according to claim 12, comprising a horizontal or at least substantially vertical transfer position of the pallet and a horizontal or at least substantially vertical position of the further pallet on the pallet support.

14. System according to claim 13, wherein the pallet support has a horizontal positioning device for the substantially horizontal displacement of the vertically placed workpiece being supplied or to be removed relative to the machine.

15. System according to claim 12, wherein the pallet support has a positioning device by means of which the further pallet can be aligned with the clamping apparatus relative to clamping abutments of the workpiece and the workpiece can be transferred to the clamping apparatus by means of a relative lifting and/or lowering movement between the further pallet and the pallet; or wherein the clamping apparatus of the further pallet comprises bore clamps that can be actuated hydraulically, and that bores or blind bores produced in the workpiece as a clamping abutment for the engagement of the bore clamps during machining are provided.

16. System according to claim 12, wherein a distance can be set in the horizontal transfer position between the pallet and the further pallet on the pallet support, which distance the aligned further pallet passes through for the transfer of the workpiece with a linear movement of the positioning device.

17. System according to claim 12, wherein the system has at least one control system for at least automatically carrying out the workpiece switch.

18. System according to claim 12, wherein the system has two pivot arms that can be pivoted up and down, pallet carriers that can be rotated thereon for turning the respective pallet, and the pallet support in front of the horizontal machining center.

19. System according to claim 12, wherein the pallet support is combined with a transport device.

20. System according to claim 19, wherein the system has a carrying device for the separate supply and depositing of blanks from above and lifting and removal of finished parts, such as a lifting gear or a robot or a carrying frame, which is functionally associated with the horizontal machining center.

* * * * *